(12) United States Patent
Schulze et al.

(10) Patent No.: US 11,341,120 B2
(45) Date of Patent: May 24, 2022

(54) HASH COMPOSITE INDEXES

(71) Applicant: SAP SE, Walldorf (DE)

(72) Inventors: Robert Schulze, Walldorf (DE); Holger Bischoff, Dielheim (DE); Neeraj Kulkarni, Berlin (DE)

(73) Assignee: SAP SE, Walldorf (DE)

( * ) Notice: Subject to any disclaimer, the term of this patent is extended or adjusted under 35 U.S.C. 154(b) by 14 days.

(21) Appl. No.: 15/931,179

(22) Filed: May 13, 2020

(65) Prior Publication Data

US 2020/0387490 A1 Dec. 10, 2020

Related U.S. Application Data

(60) Provisional application No. 62/858,693, filed on Jun. 7, 2019.

(51) Int. Cl.
*G06F 16/23* (2019.01)
*G06F 12/02* (2006.01)
(Continued)

(52) U.S. Cl.
CPC ........ *G06F 16/2379* (2019.01); *G06F 3/0604* (2013.01); *G06F 3/064* (2013.01); *G06F 3/0673* (2013.01); *G06F 9/4843* (2013.01); *G06F 12/0223* (2013.01); *G06F 12/0246* (2013.01); *G06F 12/0875* (2013.01); *G06F 12/0882* (2013.01); *G06F 16/221* (2019.01); *G06F 16/2219* (2019.01); *G06F 16/2228* (2019.01);
(Continued)

(58) Field of Classification Search
CPC ............. G06F 16/9014; G06F 16/2255; G06F 16/2228; G06F 16/2379

USPC ......................................................... 707/747
See application file for complete search history.

(56) References Cited

U.S. PATENT DOCUMENTS 9,817,858 B2 11/2017 Eisenreich et al.
9,852,169 B2 12/2017 Faerber et al.
(Continued)

OTHER PUBLICATIONS

Abadi, S. et al., "The Design and Implementation of Modern Column-Oriented Database Systems," Foundations and Trends in Databases, vol. 5, No. 3, Now Publishers Inc., 2012, pp. 177-280.
(Continued)

*Primary Examiner* — Hung T Vy
(74) *Attorney, Agent, or Firm* — Sterne, Kessler, Goldstein & Fox P.L.L.C.

(57) ABSTRACT

Disclosed herein are system, method, and computer program product embodiments for creating a dictionary-free index. An embodiment operates by a database maintaining database table comprises a column and a row. The database creates a concatenated string index comprising a concatenated string value based on the database column's row. The database also creates a hash value list having a hash value based on the concatenation string index's concatenated string value. Thereafter, the database creates a directory having a pointer to (i) a row position of the hash value list or (ii) a row position of a collision list having the row position of the hash value in the hash value list. The database also creates a collision list containing the row positions of the hash values occurring multiple times in the hash value list. The index for the database table includes the hash value list, the directory, and the collision list.

20 Claims, 7 Drawing Sheets

(51) Int. Cl.
*G06F 3/06* (2006.01)
*G06F 16/22* (2019.01)
*G06F 12/0882* (2016.01)
*G06F 16/2455* (2019.01)
*G06F 12/0875* (2016.01)
*G06F 9/48* (2006.01)

(52) U.S. Cl.
CPC ...... *G06F 16/2237* (2019.01); *G06F 16/2255* (2019.01); *G06F 16/2272* (2019.01); *G06F 16/2282* (2019.01); *G06F 16/24552* (2019.01); *G06F 16/24558* (2019.01); *G06F 2212/1024* (2013.01); *G06F 2212/1044* (2013.01)

(56) References Cited

U.S. PATENT DOCUMENTS

| | | | |
|---|---|---|---|
| 2010/0106734 A1* | 4/2010 | Calder | G06F 16/93 707/758 |
| 2016/0012089 A1 | 1/2016 | Sherkat et al. | |
| 2017/0322960 A1 | 11/2017 | Glebe et al. | |
| 2019/0065494 A1* | 2/2019 | Abali | G06F 16/90344 |

OTHER PUBLICATIONS

Aken, D.V. et al., "Automatic Database Management System Tuning Through Large-scale Machine Learning," ACM Sigmod '17, May 14-19, 2017, pp. 1009-1024.
Alexiou, K. et al. "Adaptive Range Filters for Cold Data: Avoiding Trips to Siberia," Proc. of the VLDB Endowment, vol. 6, No. 14, 2013, pp. 1714-1725.
Anderson, T., "Microsoft SQL Server 14 man: Nothing stops a Hekaton transaction," The Register, printed from http://www.theregister.co.uk/2013/06/03/microsoft_sql_server_14_teched/, Jun. 3, 2013, 8 pages.
Andrei, M. et al., "SAP HANA Adoption of Non-Volatile Memory," Proc. of the VLDB Endowment, vol. 10, No. 12, 2017, pp. 1754-1765.
Anh, V.N. and Moffat, A., "Index compression using 64-bit words," Software—Practice and Experience, vol. 40, 2010, pp. 131-147.
Arulraj, J. et al., "Multi-Tier Buffer Management and Storage System Design for Non-Volatile Memory," arXiv:1901.10938v1 [cs.DB], Jan. 30, 2019, 17 pages.
Belazzougui, D. et al., "Hash, displace, and compress," Algorithms—ESA 2009, Proc. 17th Annual European Symposium, Copenhagen, Denmark, Sep. 7-9, 2009, pp. 682-603.
Bhattacharjee, B. et al., "Efficient Index Compression in DB2 LUW," VLDB '09, vol. 2, No. 2, 2009, pp. 1462-1473.
Do, J. et al., "Turbocharging DBMS Buffer Pool Using SSDs," ACM Sigmod, 2011, pp. 1113-1124.
Eldawy, A. et al., "Spatial Partitioning Techniques in SpatialHadoop," Proc. of the VLDB Endowment, vol. 8, No. 12, 2015, pp. 1602-1605.
Elghandour, I. et al., "An XML Index Advisor for DB2," ACM Sigmod'08, Jun. 9-12, 2008, 4 pages.
Finkelstein, S. et al., "Physical Database Design for Relational Databases," ACM Trans. on Database Systems, vol. 13, No. 1, Mar. 1988, pp. 91-128.
Graefe, G. et al., "In-memory Performance for Big Data," Proc. of the VLDB Endowment, vol. 8, No. 1, 2014, pp. 37-48.
Graefe, G., "Volcano—An Extensible and Parallel Query Evaluation System," IEEE Trans. on Knowledge and Data Engineering, vol. 6, No. 1, Feb. 1994, pp. 120-135.
Gurajada, A. et al., "BTrim—Hybrid In-Memory Database Architecture for Extreme Transaction Processing in VLDBs," Proc. of the VLDB Endowment, vol. 11, No. 12, 2018, pp. 1889-1901.
Lang, H. et al., Data Blocks: Hybrid OLTP and OLAP on Compressed Storage using both Vectorization and Compilation. ACM Sigmod, 2016, pp. 311-326.
Larson, P. et al., "Real-Time Analytical Processing with SQL Server," Proc. of the VLDB Endowment, vol. 8, No. 12, Aug. 31-Sep. 4, 2015, pp. 1740-1751.
Lee, J. et al., "Hybrid Garbage Collection for Alulti-Version Concurrency Control in SAP HANA," ACM Sigmod, Jun. 26-Jul. 1, 2016, pp. 1307-1318.
Leis, V. et al., "LeanStore: In-Memory Data Management Beyond Main Memory," IEEE ICDE, 2018, pp. 185-196.
Lemke, C. et al., "Speeding Up Queries in Column Stores—A Case for Compression," Dawak, 2010, pp. 117-129.
Liu, X. and Salem, K., "Hybrid Storage Management for Database Systems," Proc. of the VLDB Endowment, vol. 6, No. 8, Aug. 26-30, 2013, pp. 541-552.
Majewski, B.S. et al., "A Family of Perfect Hashing Methods," The Computer Journal, vol. 39, No. 6., 1996, pp. 547-554.
May, N. et al., "SAP HANA—The Evolution of an In-Memory DBMS from Pure OLAP Processing Towards Mixed Workloads," BTW, 2017, pp. 545-563.
Menon, P. et al., "Relaxed Operator Fusion for In-Memory Databases: Making Compilation, Vectorization, and Prefetching Work Together at Last," Proc. of the VLDB Endowment, vol. 11, No. 1, 2017, pp. 1-13.
Müller, I. et al., "Adaptive String Dictionary Compression in In-Memory Column Store Database Systems," Open Proceedings, 10.5441/002/edbt.2014.27, 2014, pp. 283-294.
Müller, I. et al., "Retrieval and Perfect Hashing Using Fingerprinting," J. Gudmundsson and J. Katajainen (Eds.), SEA 2014: Experimental Algorithms, Springer International Publishing, 2014, pp. 138-149.
Nehme, R. and Bruno, N., "Automated Partitioning Design in Parallel Database Systems," In ACM Sigmod, 2011, pp. 1137-1148.
Neumann, T., Efficiently Compiling Efficient Query Plans for Modern Hardware, Proc. of the VLDB Endowment, vol. 4, No. 9, 2011, pp. 539-550.
Nica, A. et al., "Statisticum: Data Statistics Management in SAP HANA," Proc. of the VLDB Endowment, vol. 10, No. 12, 2017, pp. 658-1669.
On, S.T. et al., "FD-Buffer: A Buffer Manager for Databases on Flash Disks," ACM CIKM '10, Oct. 25-29, 2010, pp. 1297-1300.
Oracle® Database—Database In-Memory Guide, 19c, E96137-03, downloaded from https://docs.oracle.com/en/database/oracle/oracle-database/19/inmem/, Copyright 2016, 2020, 255 pages.
Pathak, A. et al., "Adaptive storage and access for simplified data management," *DaMoN '19*, Jul. 1, 2019, 6 pages.
Plaisance, J. et al., "Vectorized VByte Decoding," 1st Int'l Symp. on Web AlGorithms, Jun. 2015, 7 pages.
Plattner, H., "The Impact of Columnar In-memory Databases on Enterprise Systems: Implications of Eliminating Transaction-Maintained Aggregates," Proc. of the VLDB Endowment, vol. 7, No. 13, Sep. 1-5, 2014, pp. 1722-1729.
Poess, M. and Potapov, D., "Data Compression in Oracle," Proc. of the VLDB Conference, 2003, pp. 937-947.
Sacco, G.M. and Schkolnick, M., "A Mechanism For Managing The Buffer Pool In A Relational Database System Using Tire Hot Set Model," Proc. of the Eighth Int'l. Conf. on Very Large Data Bases, Sep. 1982, pp. 257-262.
Sherkat, R. et al., "Page As You Go: Piecewise Columnar Access In SAP HANA," ACM Sigmod '16, Jun. 26-Jul. 1, 2016, pp. 1295-1306.
Stoica, R. and Ailamaki, A., Enabling Efficient OS Paging for Main-Memory OLTP Databases. ACM DaMoN '13. 2013, 7 pages, 2013.
Willhalm, T. et al., "Vectorizing Database Column Scans with Complex Predicates," ADMS 2013, pp. 1-12.
Xie, D. et al., "Simba: Efficient In-Memory Spatial Analytics," ACM Sigmod '16, Jun. 26-Jul. 1, 2016, pp. 1071-1085.
Zilio, D.C. et al., "DB2 Design Advisor: Integrated Automatic Physical Database Design," Procs. of the 30th VLDB Conference, 2004, pp. 1087-1097.

* cited by examiner

HASH COMPOSITE INDEXES

CROSS-REFERENCE TO RELATED APPLICATION

This application claims priority to U.S. Provisional Patent Application No. 62/858,693, titled "Native Store Extension for Combined Workload Databases" to Sherkat et al, filed Jun. 7, 2019, which is herein incorporated by reference in its entirety.

BACKGROUND

Databases may include tables having multiple columns of data. However, searching each column for a particular data value may take time and require significant processing power. To do so, databases may also include index column. However, the inclusion of the index column can also include a dictionary. The dictionary can associate each unique data value with a particular value identifier, and the index can provide a sequential listing of each different value identifier and location(s) in the table containing the value identifier. As a result, the index can group the same value identifier together and provide the locations in the table containing the particular value identifier.

Accordingly, the index can significantly decrease the time to identify data values in datable tables. However, the inclusion of an index also requires a dictionary. Thus, databases are required to maintain two additional substructures to decrease the processing time to identify the data values in tables. This requires additional memory, which may be substantial, depending on the size of the database and the size/number of data values in the database.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
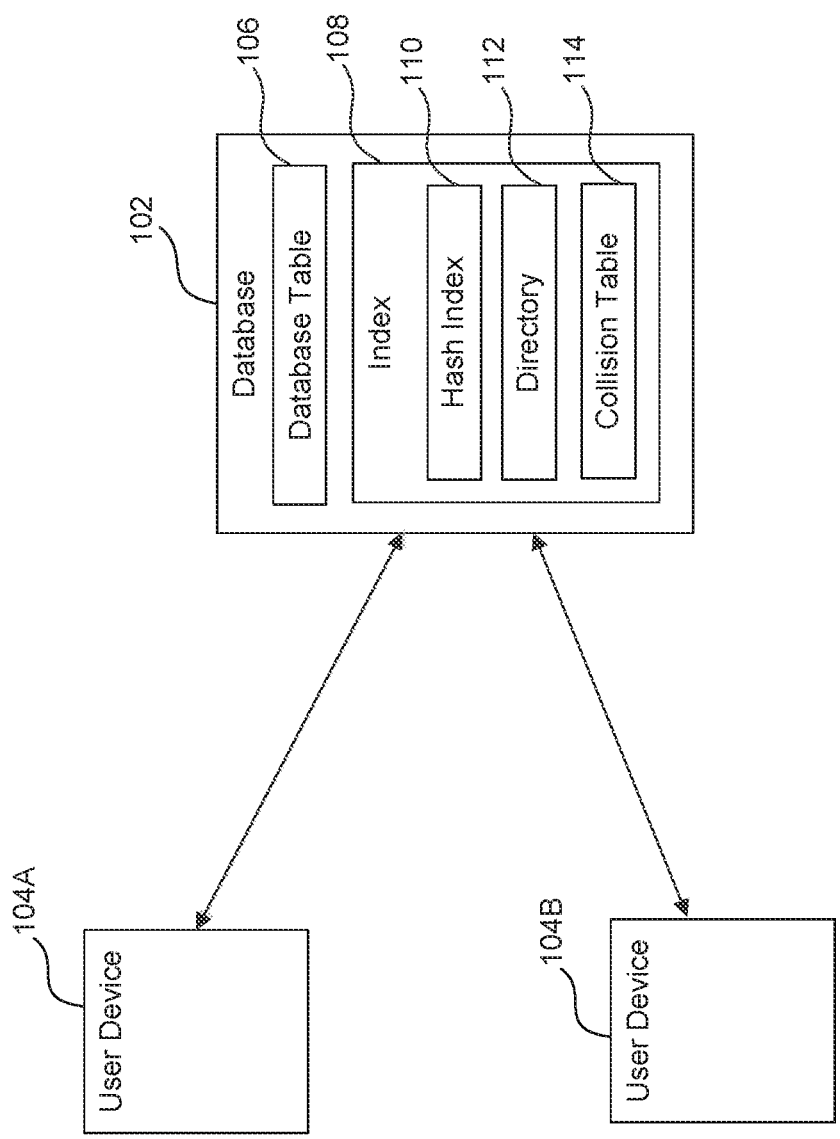
FIG. 1 illustrates a block diagram of a system for maintaining a dictionary-free index, according to some embodiments.

Provided herein are system, apparatus, device, method and/or computer program product embodiments, and/or combinations and sub-combinations thereof, for maintaining a dictionary-free index.

In some embodiments, a system includes a database containing a database table and an index. The database table can contain one or more columns and one or more rows, which together make up one or more data entries. The database table can be stored in a columnar fashion such that the columns are stored sequentially. Accordingly, each column of the database table can be represented by a single column. The index can provide a mapping from a hash value corresponding to a data value to a row position in the single column containing the data value, as well as a mapping from a row position in the single column containing the data value to a hash value corresponding to the data value.

The index can include a hash list, a directory, and a collision list. The hash list can include one or more hash values arranged in a column. The database can derive the hash values by determining a concatenated string value of corresponding rows of different columns. For example, the database can determine a first concatenated string value based on the first-row position of one or more columns, a second concatenated string value based on the second-row position of one or more column, and so on. After that, the database can apply a hash function to each concatenation string value to determine the hash value. In some embodiments, the hash function can provide a 32-byte hash value.

The database can use the directory to identify a hash value corresponding to the concatenated string value, which, in turn, as stated above, corresponds to specific corresponding rows of different columns of the database table. The directory can include an array of pointers arranged in a column. Each pointer in the array of pointers can reference a particular row position in the hash list or the collision list. In doing so, each pointer in the array of pointers can provide an offset of a particular row position in the hash list or the collision list. Further, as will be described in more detail below, the row position in the collision list can provide the row position of the hash list.

Accordingly, to create the directory, the database can rehash each hash value of the hash list using a second hash function to provide a rehash list. In doing so, the rehash list can include one or more rehash values. The second hash function of the rehash can be a perfect rehash (e.g., a minimal perfect hash) and/or provide integers from a lower bound to an upper bound (e.g., 0 to 2). Thus, the database can provide the pointer at a row position in the directory based on the rehash value. For example, when the rehash of a hash is the integer "5," the database can provide the pointer in the row position "5" of the directory.

Further, as stated previously, the pointer can reference a particular row position in the hash list or the collision list. Accordingly, depending on whether there are any collisions (i.e., matching of hash or rehash values) in the hash list or rehash list, the database can provide a pointer for the directory that references a particular row position in the hash list or the collision list. For example, when there are no collisions, the pointer can reference a particular row position in the hash list containing the hash value. However, when there are collisions, the pointer can reference a first available row position in the collision list that can contain the row position in the hash list containing the hash value. Accordingly, when there are collisions, the database can provide the row position in the hash list containing the hash value in the first available row position in the collision list and, then, in each row position in the collision list thereafter, provide each row position in the hash list containing the hash value. After doing so, the database can provide a stop indicator in the collision list.

Upon determining whether the pointer will reference the hash list or the collision list, the database can generate the pointer for the directory. When the pointer references a particular row position in hash list (e.g., "3"), the pointer can be the row position itself. However, when the pointer references a particular row position in the collision list, the pointer can be based on an offset of the particular row position in the collision list. The database can generate the pointer by first determining a binary notation of the particular row position of the collision list 406 containing the row position of hash list. In some embodiments, the most significant bit (MSB) of the binary notation of any possible row position can be 0. Accordingly, the database can change the MSB from 0 to 1, resulting in a new binary notation. After that, the database can determine a decimal notation corresponding to the new binary notation. The pointer can thus be the decimal notation of the new binary notation.

After creating the index (e.g., the hash list, the directory, and the collision list), the database can then perform the reverse mapping from a hash value provided by a user to one or more row positions of the database table. To do so, the database can rehash the received hash value using the second rehash function to determine a rehash value corresponding to the hash value. As described above, the rehash value can correspond to a row position of the directory. Accordingly, the database can determine if the rehash value corresponds to a particular row position in the directory that has a data value of zero or that is outside of the range of the row positions provided in a directory. If the rehash value corresponds to a particular row position in the directory that has a data value of zero or that is outside of the range of the row positions of the directory, the database can inform users of user devices that there are no row positions in the database table corresponding to the provided hash value.

However, if the rehash value corresponds to a particular row position in the directory that has a non-zero data value and that is not outside of the range of the row positions, the database can determine the particular row position in the directory contains a pointer to the hash list or the collision list. As stated above, the directory can include pointers in the form of decimal notations. Accordingly, the database can determine a binary notation corresponding to the decimal notation of the pointer provided in the directory's particular row position corresponding to the rehash value. The database can then identify the MSB of the binary notation and determine if the MSB is "0" or "1." If the MSB of the binary notation is "0," the database can then determine that the pointer refers to the hash list. Subsequently, the database can then identify the row position in the hash list corresponding to the requested row position in the database table based on the original decimal notation. In some embodiments, the database can verify the hash value in the identified row position of the hash list by comparing it to the hash value provided by the users of user devices. The database can then determine the requested row position in the database table based on the row position in the hash list.

Further, if the MSB of the binary notation corresponding to the decimal notation provided in the directory's row position corresponding to the rehash value is "1," the database can determine that the pointer refers to the collision list. The database can then change the MSB from "1" to "0," resulting in a new binary notation corresponding to the decimal notation provided in the directory's particular row position. After doing so, the database can determine a new decimal notation corresponding to the new binary notation. The new decimal notation can provide an offset of the first-row position in the collision list that contains a particular row position in the hash list having a hash row position corresponding to the requested row position in the database table.

As discussed above, the collision list's row positions can sequentially list row positions in the hash list that contain the same hash values. Accordingly, upon identifying the first-row position in the collision list containing a row position in the hash list, the database can then identify each row position of the hash list contained in subsequent row positions of the collision list. The database can continue to do so until reaching a stop indicator in the collision list. The database can then verify the corresponding hash values of the hash list's row positions contained in the collision list by comparing them to the hash value provided by the users of user devices. When any of the hash values in the hash list's row positions contained in the collision list are the same as the user provided hash value, the database can then determine the requested row positions of the database table based on row positions in the hash list contained in the collision list. The database can then provide the requested row positions of the database table to the users of user devices.

FIG. 1 illustrates system 100 for maintaining a dictionary free index, according to some embodiments. System 100 includes database 102 and user devices 104A and 104B. Database 102 can include database table 106 and index 108. Database table 106 can include one or more data entries and include one or more rows and one or more columns. Database 102 can store database table 106 by column such that the columns of the database are serialized. In doing so, database 102 can store index 108 as an additional column, e.g., at the end of database table 106.

Database 102 can create index 108 to identify data entries in database table 106 quickly. Thus, database 102 can utilize index 108 for a wide range of database operations, including, for example, uniqueness checks, joins, and primary key selects. Along these lines, although not illustrated, database 102 can store multiple database tables 106, with each having one or more separate indexes 108. For example, database 102 can store a single database table 106 and multiple associated indexes 108, where each index 108 is associated with a different subset of columns of database table 106.

Uniqueness checks can permit users of user devices 104A and 104B to provide data constraints to restrict values in columns. An example SQL statement may be:

CREATE TABLE PERSONS (
ID INT UNIQUE,
LAST_NAME VARCHAR(255), ... ).

As a result, database 102 can create a database table with the restriction that the ID column contains only unique values. Accordingly, if a user attempts to insert a new tuple T into the PERSONS table, database 102 can determine whether PERSONS already contains tuple T (in which case database 102 would reject the insertion). If column ID defines index 108, database 102 can quickly determine whether PERSONS already contains a row R with R.ID=T.ID. Without index 108, the DBMS needs to scan column ID for the occurrence of a value T.ID.

Joins can permit database 102 to determine the existence and position of values in multiple database tables. Without index 108, database 102 typically uses generic join algorithms, such as merge join and hash join. With index 108, database 102 can apply more specialized and faster join algorithms that exploit the value-to-position mapping provided by index 108. This greatly benefits the runtimes of complex business queries involving multiple tables.

Primary key selects can permit database 102 to filter and identify data within columns of index 108. An example SQL statement may be:

SELECT * FROM TAB
WHERE COL1=< . . . >
AND COL2=< . . . >
AND . . .
AND COLN=< . . . >

Thus, if index 108 exists on columns COL1, COL2, . . . COLN, database 102 can map the filter predicates (in the WHERE clause) directly on index 108. Using just a single index lookup, database 102 can identify matching rows directly. This is typically much faster than an individual evaluation of N filter predicates on N columns, as may be required without index 108.

Figure 2:
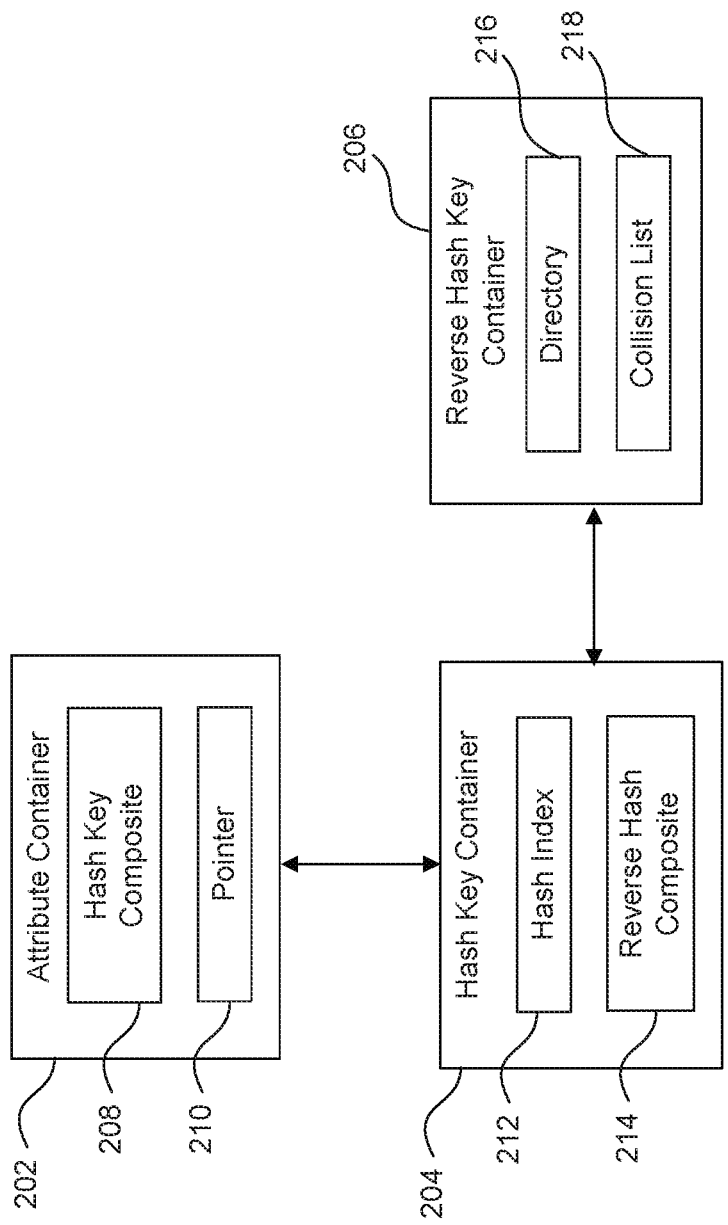
FIG. 2 illustrates an index of a database, according to some embodiments.

To utilize index 108, database 102 can create a hash list 110, directory 112, and collision table 114, which will be describe in more detail below. Referring to FIG. 2, index 200 includes attribute container 202, hash value list 204, and reverse hash value list 206. Attribute container 202 can include data from hash value list 204 (e.g., hash list 212 and reverse hash composite 214) and can include a pointer to hash value list 204. Hash value list 204 can include a hash list 212 and a reverse hash composite 214. The hash list 212 can be an array of hash values (e.g., 32-bit integers) of concatenated key values of corresponding rows of columns of database table 106, as will be described in more detail below. The reverse hash value list 206 can be a composite data structure (e.g., a single data structure) that includes a directory 216 and a collision list 218. The directory 216 can provide a mapping to specific row positions of the hash list or the collision list. The collision list 218 can include row positions of hash values that collide (i.e., occur more than once in the hash list).

Figure 3:
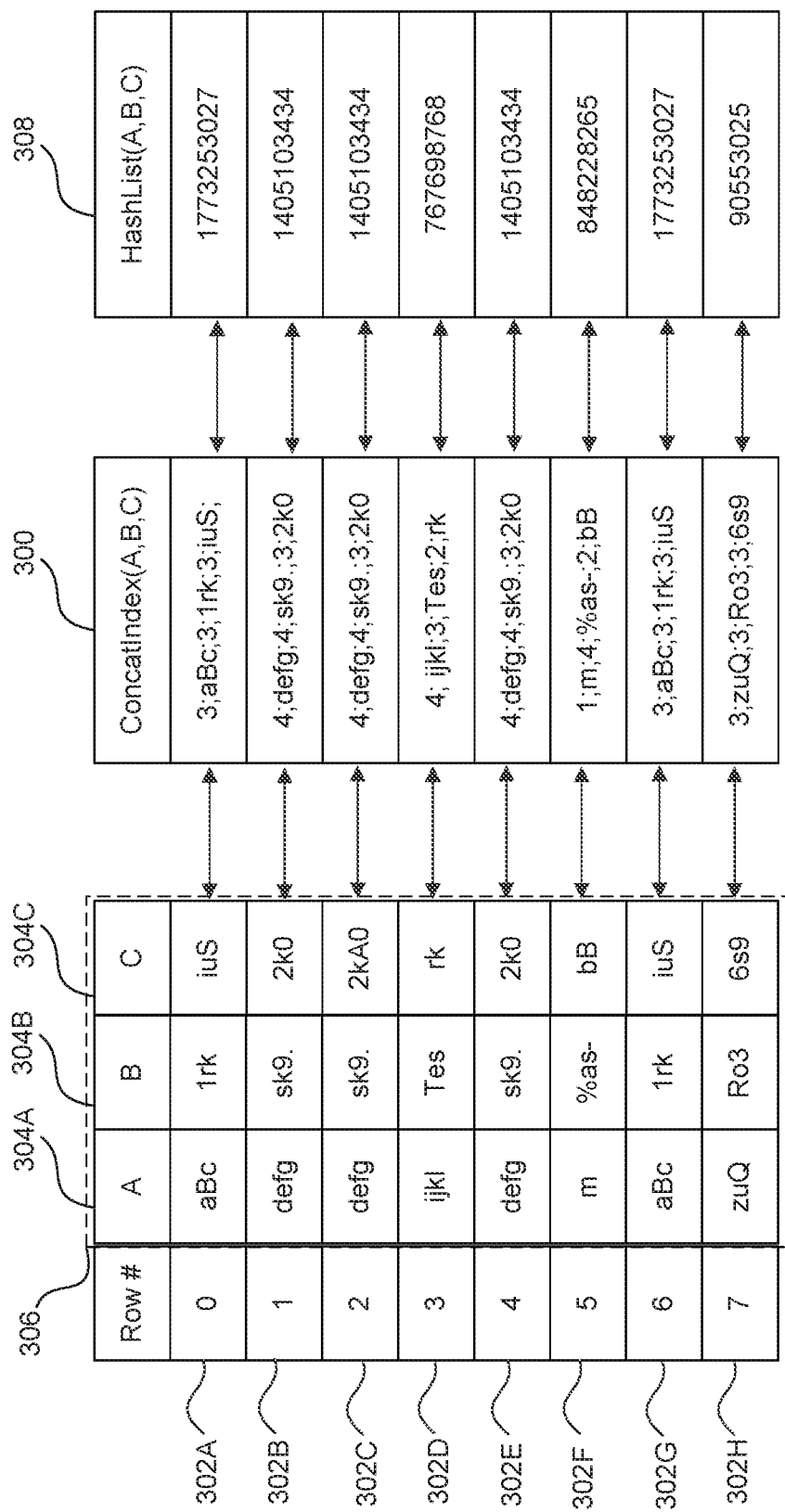
FIG. 3 illustrates a concatenated string index and a hash value list of a database table, according to some embodiments.

Accordingly, referring to FIG. 3, to create an index 108 (of FIG. 1) for database table 106, database 102 (of FIG. 1) can first create concatenated string index 300 based on database table 306. Concatenated string index 300 can include one or more concatenated string values. Database 102 can derive each concatenated string value from one or more corresponding row positions 302A-H of columns 304A-C of database table 306. Accordingly, the concatenated string value can be based on a particular row position of one or more corresponding columns. Along these lines, the corresponds columns can be of each column or a select subset of columns. For example, in the first row position 302A of database table 306's columns 304A-C, the concatenated string value is "3;aBc;3:1rk;3;iuS." Thus, the concatenated string value can provide the number of data values in each position row 302A-H of column 304A-C. For example, the portion "3;abc" of the concatenated string value can indicate that there are three data values in row position 302A of column 304A.

Database 102 (of FIG. 1) can then create hash list 308 by applying a hash function (e.g., h(x)) on each concatenated string value of concatenated string index 300. Thus, hash list 308 can include one or more hash values, where each hash value corresponds to a concatenated string value of concatenated string index 300. In some embodiments, the hash function can provide hash values as 32-bit integers. For example, the hash function can be CRC32, cksum, sum32, fletcher-32, and Alder-32, to name a few examples.

Figure 4:
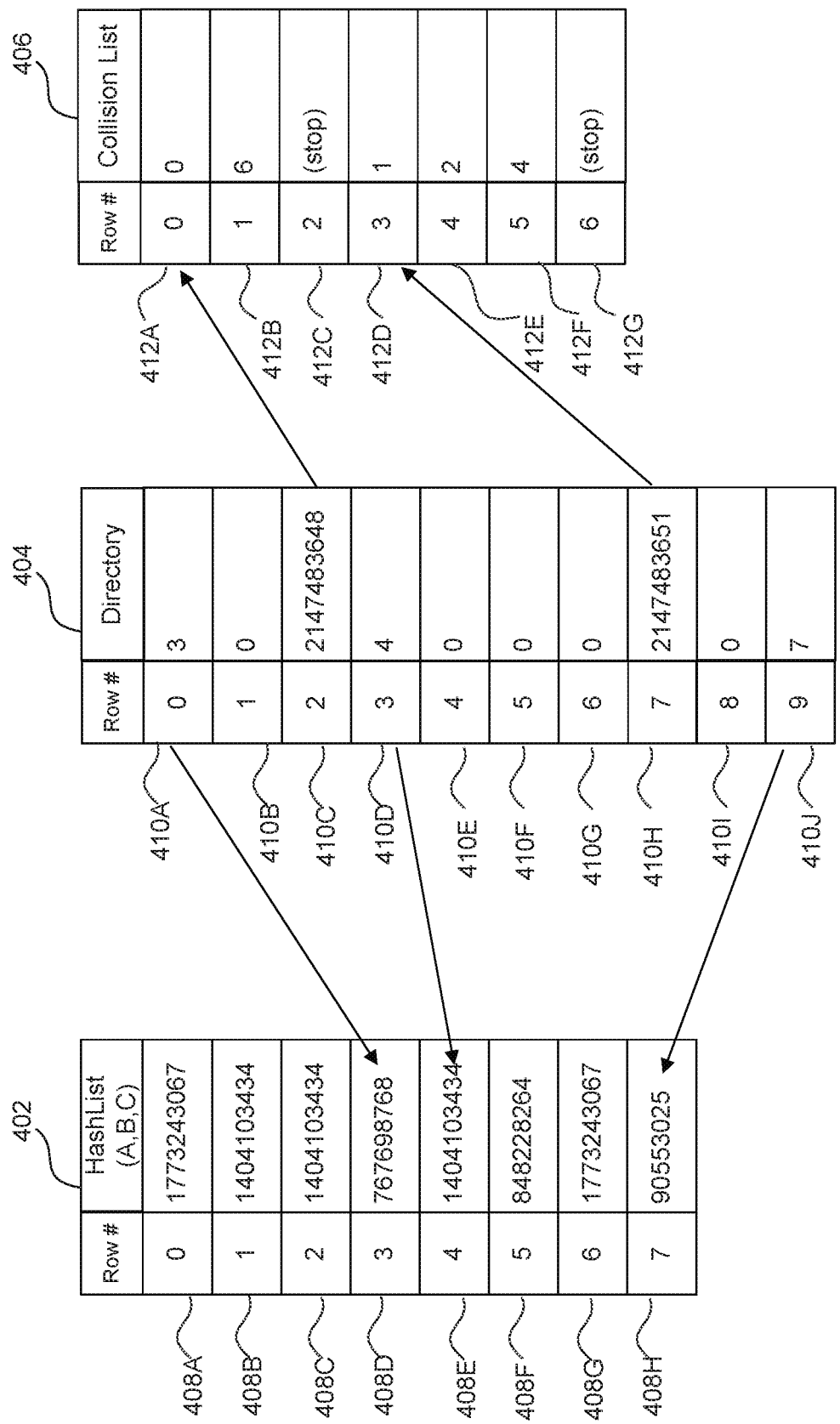
FIG. 4 illustrates a rehash value list, a directory, and a collision list of an index, according to some embodiments.

Referring to FIG. 4, after deriving hash list 308 (of FIG. 3), database 102 (of FIG. 1) can derive directory 404. Database 102 can use directory 404 to identify a hash value of hash list 402—corresponding to the concatenated string value of concatenated index 300 (of FIG. 3)—which, as stated above, corresponds to specific corresponding row positions 302A-H of columns 304A-C of database table 306 (of FIG. 3). To identify the appropriate hash value, directory 404 can include an array of pointers arranged in a column. Each pointer in the array of points can reference a particular row position 408A-H in hash list 402 or a particular row position 412A-G in collision list 406. In doing so, each pointer in the array of pointers can provide an offset of a particular row position 408A-H in hash list 402 or a particular row position 412A-G in collision list 406. For example, the particular row position 408A-H in hash list 402 can contain the hash value. Further, as will be described in more detail below, the particular row position 412A-G in collision list 406 can provide the first-row position in hash list 402 containing the hash value.

Figure 5:
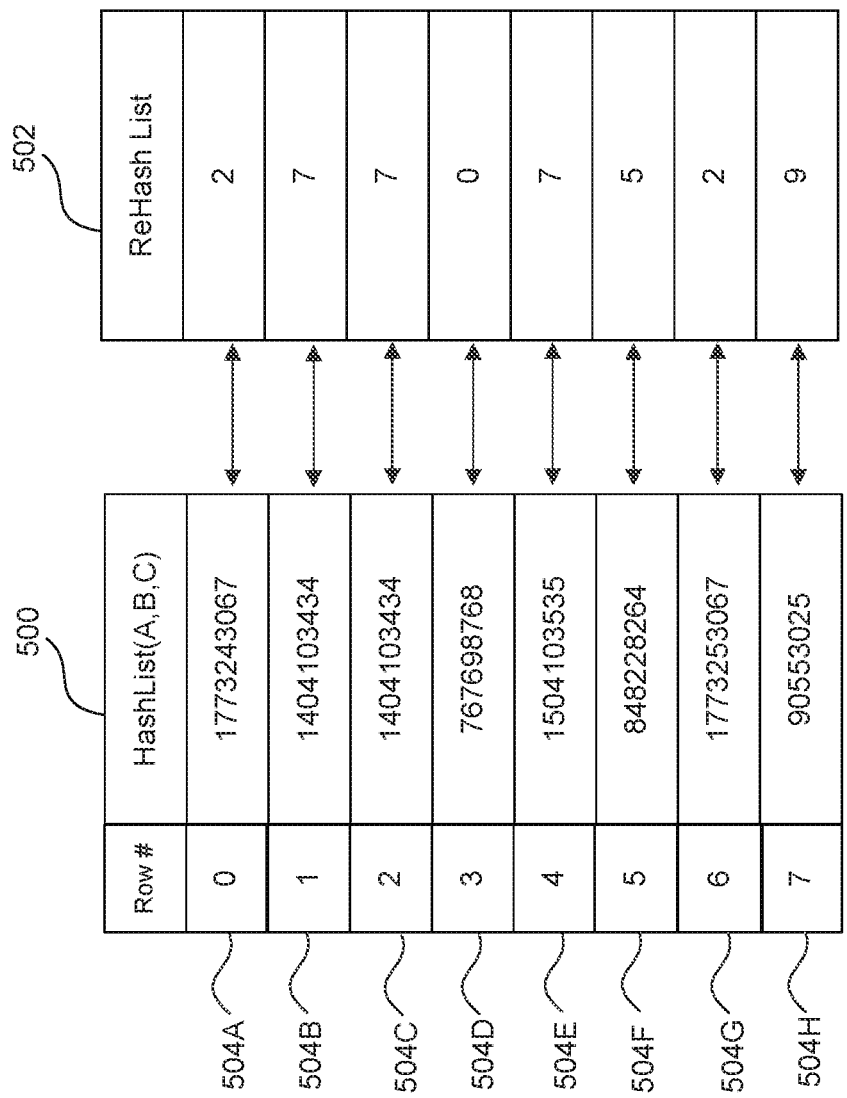
FIG. 5 illustrates a hash value list and a rehash value list corresponding to a database table, according to some embodiments.

Referring to FIG. 5, to create directory 112 and 404 (of FIGS. 1 and 4, respectively) of index 108, database 102 (of FIG. 1) can first create rehash list 502. Rehash list 502 includes one or more rehash values. Database 102 can derive each rehash value by applying a second hash function to each hash value of hash list 500. The second hash function can be different from the hash function applied to concatenated string index 300 (of FIG. 3). As in hash list 500, the second hash function can also provide a 32-byte hash value.

In some embodiments, the second hash function can have two mathematical properties. First, for each hash value of hash list 500, the second hash function can output an integer from a lower bound to an upper bound (e.g., 0 to $2^{31}$). In some embodiments, a user can provide the lower and upper bounds. For example, the lower and upper bound can include a sufficient range of numbers to be unique to each possible hash value of the rehash list 502. As a result, the upper and lower bound can provide a range of integers corresponding to the same number of rows as in hash list 500.

Second, the second hash function can be a perfect hash function. Consequently, the second hash function generates new, distinct hash values for all different hash values of rehash list 502. In turn, by applying the hash function, database 102 (of FIG. 1) can ensure that there are no collisions for different hash values of rehash list 502. Further, in some embodiments, the second hash function can be a minimal perfect hash function. Accordingly, the second hash function can output sequential integer numbers (e.g., 0, 1, 2, 3, etc.) such that there are no gaps from 0 to N.

As will be discussed in more detail below, hash function's resulting integer can indicate the row of rehash list 502 to provide a row position of the hash value in hash list 500 or a row position to a collision list indicating the hash value in hash list 500. Thus, a minimal perfect hash function can reduce the footprint of rehash list 502, for example, by not having empty rows between rows having data. Thus, starting from the first integer (e.g., 0 or 1), each consecutive row of rehash list 502 will have a row position of the corresponding hash list 500's hash value or a row position to a collision list indicating the corresponding hash list 500's hash value until all of hash list 500's hash values are accounted for.

Accordingly, referring to FIG. 4, after creating rehash list 502 (of FIG. 5), database 102 (of FIG. 1) can create directory 404. As stated above, directory 404 can include an array of pointers arranged in a column. The array of pointers can reference a particular row position 408A-H in the hash list 402 or a particular row position 412A-G in collision list 406. Accordingly, depending on whether there are any collisions (i.e., matching of hash or rehash values) in the hash list 402 or rehash list 502, the database can provide a pointer for directory 404 that references a particular row position 408A-H in hash list 502 or a particular row position 412A-G in collision list 406.

In some embodiments, when there are no collisions in hash list 402 or rehash list 502 (of FIG. 5), database 102 can generate directory 404's pointer reference as a particular row position 408A-H in hash list 402 having the hash value. For example, as illustrated, directory 404's row position 410A can include a pointer as integer "3" which corresponds to hash list 402's row position 408D. Similarly, directory 404's row position 410D can include a pointer as integer "4," which corresponds to hash list 402's row position 408E, and directory 404's row position 410J can include a pointer as integer "7." which corresponds to hash list 402's row position 408H.

Further, in some embodiments, when there are collisions in hash list 402 or rehash list 502 (of FIG. 5), database 102 can provide the corresponding row positions 408A-H of hash list 402's hash values in the first available row positions 412A-G of collision list 406. For example, database 102 can determine that hash list 402's hash value "1773243067" occurs multiple time at row positions 402A and 402G and that hash list 402's hash value "1404103434" occurs at multiple times at row positions 504B, 504C, and 504E. Similarly, database 102 can determine that the corresponding rehash list 502's rehash values (of FIG. 5) occurs the same number of times. Thus, for the first collision (e.g., hash list 402's hash value "1773243067"), database 102 can provide the the row positions 408A-H of hash list 402 in the first available row positions 412A-G of collision list 406 (i.e., "0" and "6"). Database 102 can then provide a stop indication in the following available row position 412C. Database 102 can do the same for each collision in hash list 402 or rehash list 502 (of FIG. 5).

After doing so, database 102 (of FIG. 1) can generate the pointer to a particular row position 412A-G in collision list 406 based an offset of the particular row position 412A-G in collision list 406 having the first row position 408A-H in hash list 402 containing the hash value. Database 102 can generate the pointer by first determining a binary notation of the particular row position 412A-G of collision list 406 containing a row position 408A-H in hash list 402. The binary notation can depend on the range of integers that the second rehash function provides based on the hash values. In doing so, database 102 can determine a binary notation corresponding to collision list 406's row positions 412A-G such that each collision list 406's row position 412A-G has a different binary notation with a most significant byte (MSB) of 0. For example, the second hash function can provide integers from 0 to $2^{31}-1$. Accordingly, database 102 can provide a 32 bit binary notation for each collision list 406's row position 412A-G to ensure that 0 is the MSB for each possible binary representation of collision list 406's row positions 412A-G. Along these lines, collision list 406's row position 412A-G can be associated with sequential binary notations. For example, collision list 406's row position 412A can be associated with binary notation 0000.0000.0000.0000.0000.0000.0000.0000, collision list 406's row position 412B can be associated with binary notation 0000.0000.0000.0000.0000.0000.0000.0001, and so on.

After determining the binary notation corresponding to the offset in collision list 406, database 102 (of FIG. 1) can then change the MSB from from 0 to 1. Thereafter, database 102 determine a decimal notation corresponding to the new binary notation. The pointer can thus be the decimal notation of the new binary notation. Accordingly, directory 404 can include pointers in the form of decimal notations.

For example, as explained above, database 102 can determine that hash list 402's hash value "1404103434" occurs multiple time at row positions 408B, 408C, and 408E. Thus, database 102 can generate the pointer based on the binary representation corresponding to the collision list 406's row position 412A, which is the first row position in collision list 406 containing a row position in hash list 402 that has a hash value. Database 102 can determine that the binary representation corresponding to collision list 406's row position 412A is 0000.0000.0000.0000.0000.0000.0000.0000. Database 102 can change the MSB of the binary notation from 0 to 1, resulting in the new binary notation to be 1000.0000.0000.0000.0000.0000.0000.0000. Database 102 then determine that the decimal notation of the new binary notation (i.e., 1000.0000.0000.0000.000.0000.0000.000) is 2147483648. Database 102 can identify 2147483648 as the pointer for this collision.

As another example, as also explained above, database 102 can determine that hash list 402's hash value "1404103434" occurs multiple times at row positions 408B, 408C, and 408E. As also explained above, database 102 can provide the corresponding row positions 408B, 408C, and 408E of hash list 402's hash value "1404103434" in collision list 406's row positions 412D, 412E, and 412F, respectively. Thus, database 102 can generate the pointer based on the binary representation corresponding to the collision list 406's row position 412D, which is the first row position in collision list 406 containing a row positing in hash list 402 that has a hash value. Database 102 can determine that the binary representation corresponding to collision list 406's row position 412A is 0000.0000.0000.0000.0000.0000.0000.0011. Database 102 can change the MSB of the binary notation from 0 to 1, resulting in the new binary notation to be 1000.0000.0000.0000.0000.0000.0000.0011. Database 102 then determine that the decimal notation of the new binary notation (i.e., 1000.0000.0000.0000.0000.0000.0000.0011) is 2147483641. Database 102 can identify 2147483641 as the pointer for this collision.

Accordingly, after determining the pointer, database 102 can then provide directory 404's pointer in a specific row position 410A-J, resulting from the rehash of the corresponding hash value. For example, as illustrated in FIG. 5, the rehash of hash value "1404103434" is "7." Accordingly, the pointer corresponding to this hash value is provided in a particular row position 410J (i.e., row position "7"') corresponding to the rehash value of "7."

Along these lines, in some embodiments, as stated above, the second hash function—used to provide the rehash list 502 (of FIG. 5) and determine the appropriate row position 410A-J in directory 404—may not be sequential. As a result, some of directory 404's row positions 410B, 410D-G, and 410I may not contain any pointers. Accordingly, database 402 can provide a data value of "0" in row positions 410B, 410D-G, and 410I not containing any pointers.

Referring to FIG. 1, after creating index 106, database 102 can perform reverse mapping without a dictionary. In doing so, database 102 can receive a request for a row position 302A-H in database table 306 (of FIG. 3) corresponding to a particular hash value from users of user devices 104A and 104B. Accordingly, in providing the request to database 102, users of user devices 104A and 104B can provide the particular hash value.

Upon receipt of the hash value from users, database 102 can then apply the second rehash function described above to derive a rehash value of the received hash value. Referring to FIG. 4, as described above, the rehash value can correspond to a particular row position 410A-J of directory 404. Accordingly, database 102 (of FIG. 1) can determine if the rehash value corresponds to a particular row position 410A-J in directory 404 that has a data value of zero or that is outside of the range of row positions 410A-J provided in directory 404. If the rehash value corresponds to a particular row position 410A-J in directory 404 that has a data value of zero or that is outside of the range of row positions 410A-J provided in directory 404, database 102 can inform users of user devices 104A and 104B (of FIG. 1) that there are no row positions 302A-H in database table 306 (of FIG. 3) that correspond to the provided hash value.

However, if the rehash value corresponds to a particular row position 410A-J in directory 404 that has a non-zero data value and that is not outside of the range of row positions 410A-J, database 102 (of FIG. 1) can determine the particular row position 410A-J in directory 404 contains a pointer to hash list 402 or collision list 406.

As stated above, directory 404 can include pointers in the form of decimal notations. Accordingly, database 102 can determine a binary notation corresponding to the decimal notation of the pointer provided in directory 404's particular row position 410A-J corresponding to the rehash value. Database 102 can then identify the MSB of the binary notation and determine if the MSB is "0" or "." If the MSB of the binary notation is "0," database 102 can then determine that the pointer refers to hash list 402. Database 102 can then identify row position 408A-H in hash list 402 corresponding to the requested row position 302A-H in database table 306 (of FIG. 3) based on the original decimal notation. In some embodiments, database 102 can verify the hash value in the identified row position 408A-H of hash list 402 by comparing it to the hash value provided by the users of user devices 104A and 104B (of FIG. 1). If the hash values are the same, database 102 can then determine the requested row position 302A-H in database table 306 (of FIG. 3) based on the row position 408A-H in hash list 402. However, if the hashes are not the same, database 102 can inform users of user devices 104A and 104B (of FIG. 1) that there are no row positions 302A-H in database table 306 (of FIG. 3) that correspond to the provided hash value.

For example, if the data value contained in directory 404's particular row position 410A-J is "3," database 102 can determine that the MSB of the corresponding binary representation "0000.0000.0000.0000.0000.0000.0000.0011" is "0" and thus the original decimal notation refers to a particular row position 408A-H in hash list 402. Accordingly, in this example, database 102 can determine that the original decimal notation "3" corresponds to hash list 402's row position 408D. Database 102 can verify that the hash value (i.e., "767698768") of hash list 402's row position 408D is the same as the has value provided by the user. If so, database 102 can then determine that row position 302D in database table 306 (of FIG. 3) corresponds to row position 408D of hash list 402 and provide the row position 302 to users of user devices 104A and 104B.

Further, if the MSB of the binary notation corresponding to the decimal notation provided in directory 404's row position 410A-J corresponding to the rehash value is "1," database 102 can determine that the pointer refers to collision list 406. Database 102 can then change from the MSB from "1" to "0" resulting in a new binary notation corresponding to the decimal notation provided in directory 404's particular row position 410A-J. After doing so, database 102 can determine a new decimal notation corresponding to the new binary notation. The new decimal notation can provide an offset of the first-row position 412A-G in collision list 406 that contains a particular row position 408A-H in hash list 402 having a hash row position 408A-H the requested row position 302A-H in database table 306 (of FIG. 3).

As discussed above, collision list 406's row positions 412A-G can sequentially list row positions 408A-H in hash list 402 that contain the same hash values. Accordingly, upon identifying the first-row position 412A-G in collision list 406 containing a row position 408A-H in hash list 402, database 102 can then identify each row position 408A-H of hash list 402 contained in subsequent row positions 412A-G of collision list 406. Database 102 can continue to do so until reaching a stop indicator in a row position 408A-H of collision list 406. Database 102 can thereafter verify the corresponding hash values of hash list 402's row positions 408A-H contained in collision list 406 by comparing them to the hash value provided by the users of user devices 104A and 104B (of FIG. 1).

If the hash values in the hash list 402's row positions contained in collision list are the same as the user provided hash value, database 102 (of FIG. 1) can then determine the requested row positions 302A-H of database table 306 (of FIG. 3) based on row positions 408A-H in hash list 402 contained in collision list 406. Database 102 can then provide the requested row position 302A-H of database table 406 to users of user devices 104A and 104B. However, if any of the hash values in the hash list 402's row positions contained in collision list are not the same as the user provided hash value, database 102 can disqualify the corresponding row positions 408A-H of hash list 402. Along these lines, if none of the hash values in the hash list 402's row positions contained in collision list are the same as the user provided hash value, database 102 can inform users of user devices 104A and 104B that there are no row positions 302A-H in database table 306 that correspond to the requested hash value As another example, if the data value contained in directory 404's particular row position 410A-J is "2147483648," database 102 can determine that the MSB of the corresponding binary representation "1000.0000.0000.0000.0000.0000.0000.000" is "1" and thus refers to a particular row position 412A-G in collision list 406. Database can than change the MSB of the binary representation from "0" to "1," resulting in the new binary representation being "0000.0000.0000.0000.0000.0000.0000.0000." Database 102 can use the binary representation "0000.0000.0000.0000.0000.0000.0000.0000" to identify the first row position in collision list 406 containing a row position 408A-H in hash list 402 having the hash integer. In this example, database 102 can determine that the first row position in collision list 406 containing a row position 408A-H in hash list 402 having the hash integer is row position 412A of collision list 406. Database 102 can then the data values read each row position 412A-G in collision list 406 subsequent to 412A until reaching a stop indicator to determine each row position 408A-H in hash list 402 having the requested hash integers. In this example, database 102 can read the data values in row positions 412A-C of collision list 406 and, in doing so, stop upon reaching the stop indicator provided in row position 412C. As shown, the data values in row positions 412A-C of collision list 406 correspond to row position 408A (i.e., "0") of hash list 402, row position 408G (i.e., "6") of hash list 402, the stop indicator. Database 102 can then identify the requested hash values of hash list 402 using the row positions 408A-H of hash list 402 contained in collision list 406. Database 102 can then provide the requested hash value to users of user devices 104A and 104B (of FIG. 1).

Figure 6:
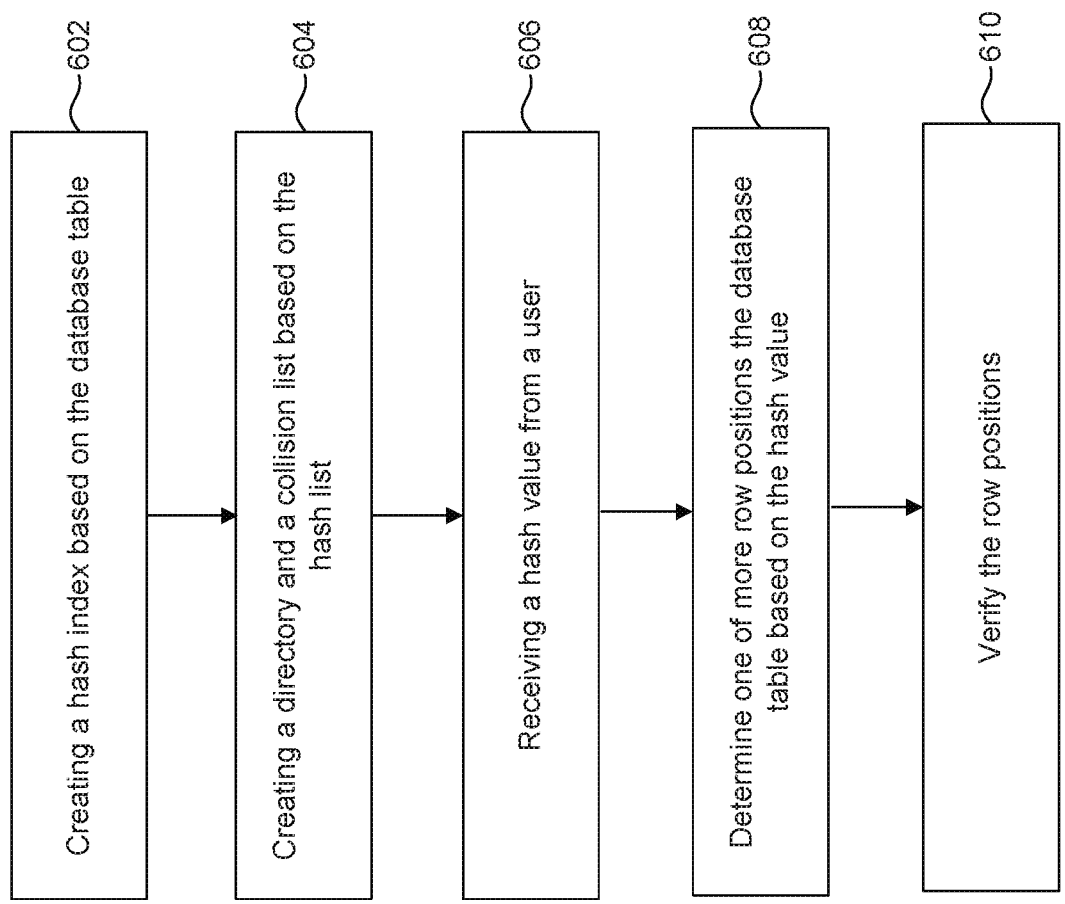
FIG. 6 illustrates a flowchart illustrating a process for providing a dictionary-free index, according to some embodiments.

FIG. 6 is a flowchart for a method 600 for maintaining a dictionary free index, according to an embodiment. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

Method 600 shall be described with reference to FIGS. 1-5. However, method 600 is not limited to those example embodiments.

At 602, database 102 can create hash list 104 based on database table 306. To do so, database 102 can first create concatenated string index 3X) based on database table 306. Concatenated string index 300 can include one or more concatenated string values. Database 102 can derive each concatenated string value from corresponding row positions 302A-H of columns 304A-C of database table 306. Accordingly, the concatenated string value can be based on a particular row position of one or more corresponding columns. Along these lines, the corresponds columns can be of each column or a select subset of columns. For example, database 102 can determine a first concatenated string value based on the first-row position of one or more columns, a second concatenated string value based on the second-row position of one or more column, and so on Database 102 can then create hash list 308, 402, and 500 by applying a hash function (e.g., h(x)) on each concatenated string value of concatenated string index 300. Thus, hash list 308 can include one or more hash values, where each hash value corresponds to a concatenated string value of concatenated string index 300. In some embodiments, the hash function can provide hash values as 32-bit signed integers. For example, the hash function can be CRC32, cksum, sum32, fletcher-32, and Alder-32, to name a few examples.

At 604, database 102 can create directory 112 and 404 and a collision list 406 based on the hash list 308, 402, and 500. To create directory 112 and 404, database 102 can create rehash list 502. Rehash list 502 includes one or more rehash values. Database 102 can derive each rehash value by applying a second hash function to each hash value of hash list 402. The second hash function can be different from the hash function applied to concatenated string index 300. Like in hash list 500, the second hash function can also provide a 32-byte hash value.

Database can then create the directory 112 and 404 based on hash list 308, 402, and 500 and rehash list 502. Directory 404 can include an array of pointers arranged in a column. The array of pointers can reference a particular row position 408A-H in the hash list 402 or a particular row position 412A-G in collision list 406. Accordingly, depending on whether there are any collisions (i.e., matching of hash or rehash values) in the hash list 402 or rehash list 502, database 102 can provide a pointer for directory 404 that references a particular row position 408A-H in hash list 502 or a particular row position 412A-G in collision list 406.

At 606, database 102 can receive a hash value from a user for receipt of corresponding rows 302A-H of columns 304A-C of database table 306. Database 102 can then apply the second rehash function described above to derive a rehash value of the received hash value. The rehash value can corresponding to a particular row position 410A-J of directory 404. Accordingly, database 102 (of FIG. 1) can determine if the rehash value corresponds to a particular row position 410A-J in directory 404 that has a data value of zero or that is outside of the range of row positions 410A-J provided in directory 404. If the rehash value corresponds to a particular row position 410A-J in directory 404 that has a data value of zero or that is outside of the range of row positions 410A-J provided in directory 404, database 102 can inform users of user devices 104A and 104B (of FIG. 1) that there are no row positions 302A-H in database table 306 (of FIG. 3) that correspond to the provided hash value. However, if the rehash value corresponds to a particular row position 410A-J in directory 404 that has a non-zero data value and that is not outside of the range of row positions 410A-J, database 102 (of FIG. 1) can determine the particular row position 410A-J in directory 404 contains a pointer to hash list 402 or collision list 406.

The pointer to hash list 402 can indicate a particular row position 408A-H of hash list 402. The pointer to collision list 406 can indicate a first row position 412A-G of collision list 412 providing a particular row position 408A-H of hash list 402. As stated above, collision list 406 can sequentially list row positions 408A-H of hash list 402 that correspond to the same hash values. Accordingly, database 102 can identify the row position of hash list 402 providing in the first row position 412A-H of collision list 412. Database 102 can then continue to identify each subsequent row position 408A-H of hash list 402 provided in collision list 412 until reaching a stop indicator.

At 608, database 102 can determine one or more row positions 302A-H of database table 306 based on the user provided hash value. As explained above, based on the user provided hash value, database 102 can identify an appropriate pointer in directory 404. And, based on the pointer, database 102 can identify particular row positions 408A-H of hash list 402. Database 102 can thus determine the corresponding row positions 302A-H of database table 306 based on the identified row positions 408A-H of hash list 402.

At 610, database 102 can verify the identified row positions 302A-H of database table 306. As described, database 102 can identify row positions 408A-H of hash value list 402 based on the pointer of director 404. Accordingly, database 102 can then confirm that the data values corresponding to the identified row positions 408A-H of hash value list 402 are the same as the user-provided hash values.

Figure 7:
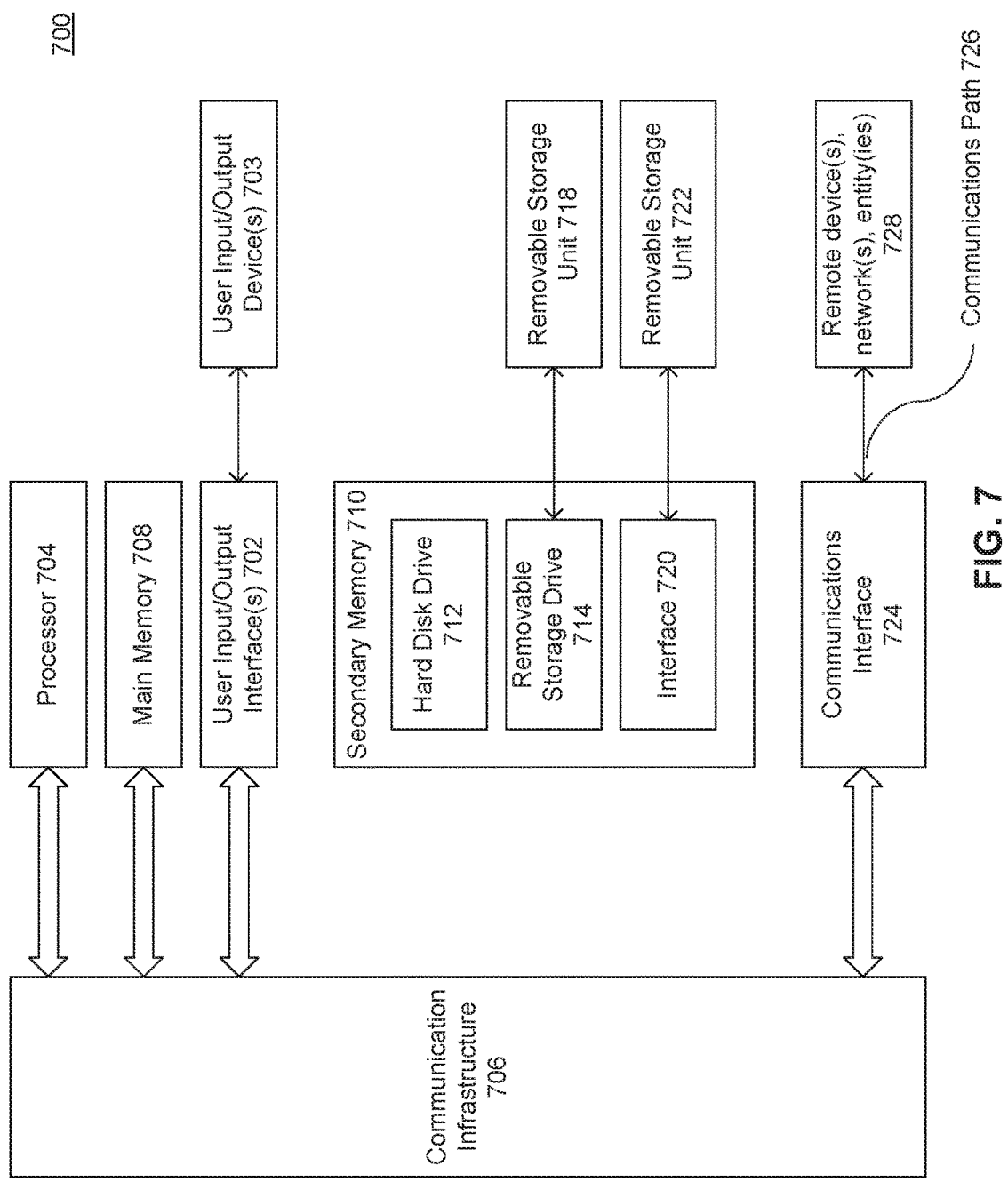
FIG. 7 illustrates an example computer system useful for implementing various embodiments.

Various embodiments may be implemented, for example, using one or more well-known computer systems, such as computer system 700 shown in FIG. 7. One or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON). Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for maintaining an index for a database table, comprising:
    maintaining the database table having data entries in a plurality of columns and at least a row;
    creating a concatenated string index comprising a concatenated string value based on the row of the database table, wherein the concatenated string index occupies a first additional column;
    creating a hash value list comprising a hash value that is derived based on the concatenated string value of the concatenated string index, wherein the hash value list occupies a second additional column, and the second additional column is within the database table; and
    creating a directory comprising an array of pointers arranged in a column, a pointer of the array of pointers includes a reference to a row position of the hash value list or a row position of a collision list having the row position of the hash value in the hash value list; and
    creating the collision list comprising a plurality of row positions having a same hash value provided in the hash value list,
    wherein the index for the database table comprises the hash value list, the directory, and the collision list, without a dictionary.

2. The computer-implemented method of claim 1, the maintaining the database table comprising:
    maintaining the database table having a first and second columns and a first and second rows, wherein the concatenated string index is based on the first row of the first and second columns.

3. The computer-implemented method of claim 2, the maintaining the database table having the first column and the second column comprising:
    maintaining the database table having the first column and the second column that each includes a first and a second data entry, and
    the creating the concatenated string index comprising a concatenated string value comprising:
    deriving a first concatenated string based on the first data entry of the first column and the second column of the database table;
    deriving a second concatenated string based on the second data entry of the first column and the second column of the database table, and creating the concatenated string index comprising the first concatenated string and the second concatenated string,
    wherein the hash value list comprises a first hash value followed by a second hash value such that the first hash value and the second hash value correspond to and are derived from the first concatenated string and the second concatenated string of the concatenation string index, respectively.

4. The computer-implemented method of claim 3, the creating the hash value list comprising:
    performing a first hash function on the first concatenated string and the second concatenated string of the concatenated string index to generate the first hash value and the second hash value, respectively;
    creating the hash value list comprising the first hash value followed by the second hash value such that the first hash value and the second hash value correspond to and are derived from the first concatenation and the second concatenation of the concatenation container, respectively.

5. The computer-implemented method of claim 4, the creating the directory comprising:
    performing a second hash function on the first hash value and the second hash value to generate a first rehash value and a second rehash value, respectively, such that the first rehash value and the second rehash value correspond to a first row position and a second row position of the directory, respectively;
    determining a first row position and a second row position of the directory based on the first hash value and the second hash value, respectively; and
    providing a first pointer and a second pointer in a first row position and a second row position of the directory,
    wherein the first pointer references a first row position corresponding to the first hash value in the hash list, and
    wherein the second pointer references a second row position corresponding to the second hash value in the hash list.

6. The computer-implemented method of claim 5, the creating he directory further comprising:
    performing the second hash function on the first hash value and the second hash value to generate a first integer and a second integer, respectively, such that the first integer and the second integer correspond to a first row position and a second row position of the directory, respectively;
    determining a first row position and a second row position of the directory based on the first integer and the second integer, respectively, such that the first row position or the second row position of the directory is a different row position than the first row position or the second row position of the first hash value and the second hash value in the hash list, respectively;
    determining that the first hash value is different from the second hash value;
    providing the first row position corresponding to the first hash value of the hash value in the first row position of the directory; and
    providing the second row position corresponding to the second hash value of the hash value in the second row position of the directory.

7. The computer-implemented method of claim 6, the performing the second hash function on the first hash value and the second hash value to generate the first integer and the second integer, respectively, comprising:

performing the second hash function on the first hash value and the second hash value to generate the first integer and the second integer, respectively,
wherein the second hash function is a minimal hash function.

8. The computer-implemented method of claim 4, the creating the directory comprising:
determining that the first hash value is equal to the second hash value;
creating the directory comprising the pointer to a first available row position in the collision list, and
the creating the collision list comprising:
creating the collision list comprising a first row position, a second row position, and a third position, wherein the first row position and the second row position of the collision list comprise the first hash value and the second hash value in the hash list, respectively, and wherein the third row position of the collision list comprises a stop indicator.

9. The computer-implemented method of claim 8, the creating the directory-comprising the pointer to the first available row position comprising:
performing a second hash function on the first hash value or the second hash value to generate a first rehash value or a second rehash value, respectively, such that the first rehash value is the same as the second rehash value; and
providing the pointer at a row position in the directory corresponding to the first rehash value or the second rehash value.

10. The computer-implemented method of claim 9, the performing the second hash function on the first hash value to generate the first integer and the second integer comprising:
performing the second hash function on the first hash value to generate the first integer and the second integer,
wherein the second hash function is a perfect hash function.

11. The computer-implemented method of claim 8, the creating the directory comprising the pointer to the first available row position comprising:
determining a binary notation of the first row position of the collision list;
creating the pointer of the directory based on the first position of the collision list.

12. The computer-implemented method of claim 11, the creating the point of the directory comprising:
identifying a most significant byte of the binary notation of the first row position of the collision list;
modifying the most significant byte of the binary notation of the first row position of the collision list to create a new binary notation corresponding to the first row position of the first collision list;
determining a new decimal notation based on the new binary notation;
providing the new decimal notation as the pointer.

13. A computer-implemented method for managing an index of a database table, comprising:
receiving a hash value list comprising a hash value that is derived based on a concatenated string value of a concatenated string index, wherein the hash value list occupies an additional column of the database table, wherein the database table has data entries in a plurality of columns and at least a row:
determining a row position of a directory of an index based on the hash value;
identifying a pointer in the directory based on the row position of the directory;
determining that the pointer references a row position in a hash list or a row position in a collision list, wherein the row position in the collision list comprises the row position in the hash list, wherein the row position in the hash list corresponds to the row position of the database table, and wherein the index comprises the hash list, the directory, and the collision list, without a dictionary; and
determining the row position in the database table based on the pointer.

14. The computer-implemented method of claim 13, further comprising:
performing a first hash function on the hash value to derive a rehash value, wherein the row position of the directory of the index is based on the rehash value.

15. The computer-implemented method of claim 14, further comprising:
performing the first hash function on the hash value to derive the rehash value such that the first hash function is different from a second hash function used to derive the hash value from the row position of the database table,
wherein the row position of the directory of the index is based on the rehash value.

16. The computer-implemented method of claim 13, the identifying the pointer in the directory based on the row position of the directory comprising:
identifying the pointer in the directory based on the row position of the directory such that the pointer is an integer that is in decimal notation.

17. The computer-implemented method of claim 16, the determining that the pointer references the row position in the hash list or the row position in the collision list comprises:
determining that the pointer references the row position in the hash list or the row position in the collision list based on the integer of the pointer.

18. The computer-implemented method of claim 17, the determining that the pointer references the row position in the hash list or the row position in the collision list based on the pointer comprises:
converting the decimal notation to a binary notation; and
determining that the pointer references the row position in the hash list or the row position in the collision list based on the binary notation.

19. The computer-implemented method of claim 13, further comprising:
identifying the hash value corresponding to the row position of the hash list;
verifying that the hash value corresponding to the row position of the hash list is equal to the received hash value; and
wherein the determining of the row position in the database table is further based on the verifying of the hash value.

20. A non-transitory computer-readable device having instructions stored thereon that, when executed by at least one computing device, cause the at least one computing device to perform operations comprising:
maintaining the database table having data entries in a plurality of columns and a row;
creating a concatenated string index comprising a concatenated string value based on the row of the column, wherein the concatenated string index occupies a first additional column;

creating a hash value list comprising a hash value that is derived based on the concatenated string value of the concatenated string index, wherein the hash value list occupies a second additional column, and the second additional column is within the database table; and creating a directory comprising an array of pointers arranged in a column, a pointer of the array of pointers includes a reference to a row position of the hash value list or a row position of a collision list having the row position of the hash value in the hash value list; and creating the collision list comprising plurality of row positions having a same hash value provided in the hash value list, wherein the index for the database table comprises the hash value list, the directory, and the collision list, without a dictionary.

* * * * *